United States Patent [19]

Osafune

[11] Patent Number: 4,745,275
[45] Date of Patent: May 17, 1988

[54] SENSOR CIRCUIT
[75] Inventor: Koji Osafune, Tokyo, Japan
[73] Assignee: Kabushiki Kaisha Toshiba, Kawasaki, Japan
[21] Appl. No.: 727,435
[22] Filed: Apr. 26, 1985
[30] Foreign Application Priority Data
  Apr. 29, 1984 [JP] Japan .................. 59-87593
[51] Int. Cl.$^4$ ............................. G01V 9/04
[52] U.S. Cl. ................. 250/221; 250/222.1; 340/825.54
[58] Field of Search ............ 250/206, 214 R, 221, 250/222.1, 574; 340/505, 506, 512, 825.54; 361/139, 173–177

[56] References Cited
U.S. PATENT DOCUMENTS
4,163,969  8/1979  Enemark ............... 250/574 X
4,311,986  1/1982  Yee ........................ 340/825.54
4,360,912 11/1982  Metz et al. ............ 340/825.54
4,551,710 11/1985  Troup et al. .......... 340/505

FOREIGN PATENT DOCUMENTS
2932173  3/1980  Fed. Rep. of Germany .

Primary Examiner—Eugene R. Laroche
Assistant Examiner—Steven J. Mottola
Attorney, Agent, or Firm—Finnegan, Henderson, Farabow, Garrett & Dunner

[57] ABSTRACT

A sensor circuit including a current-driven type sensor for detecting changes in a predetermined state and control means having an input applied discontinuously with the output signal of the sensor means, wherein circuit arrangement is made such that the sensor means is supplied with a driving current only when the control means requires the output signal of the sensor means as the input signal to the control means. The sensor circuit finds advantageous application in floppy disc drives.

4 Claims, 6 Drawing Sheets

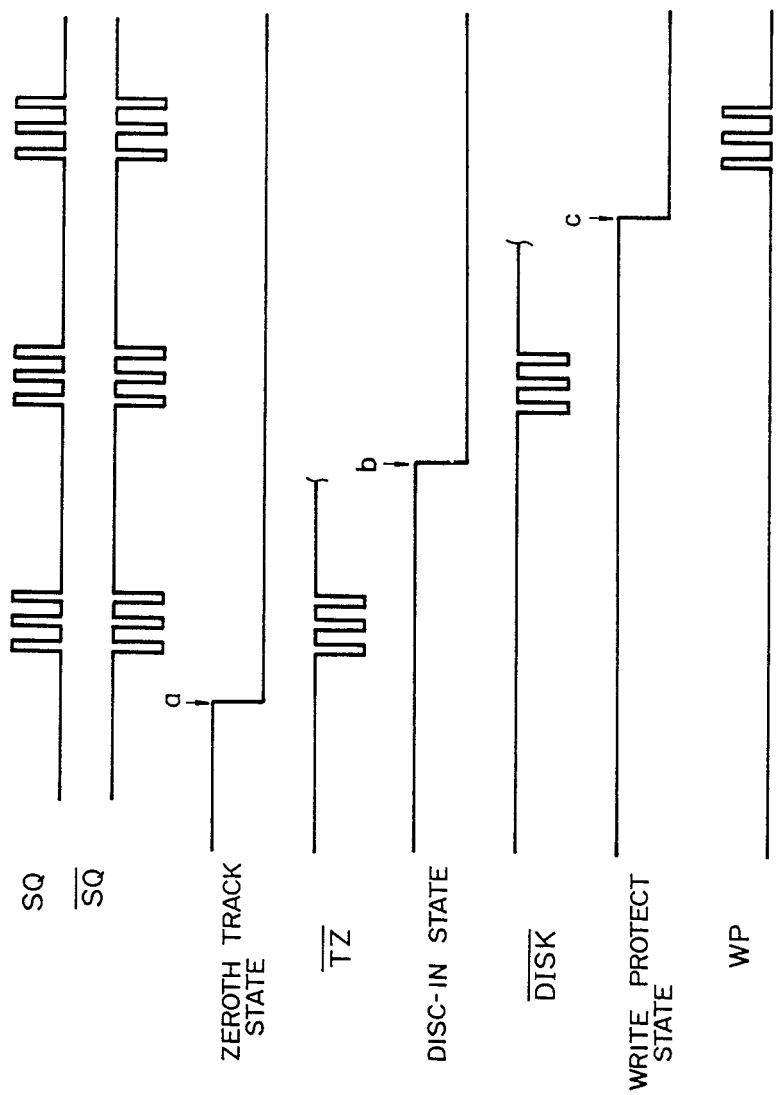

SENSOR CIRCUIT

BACKGROUND OF THE INVENTION

1. Field of the Invention

The present invention relates generally to a sensor circuit. More particularly, the invention concerns a sensor circuit which is advantageously suited for use in combination with a cell-driven type floppy-disc drive.

2. Description of the Prior Art

Heretofore, the floppy-disc drives have found wide applications as inexpensive high-density external storage devices for various data processing systems and equipments.

In the floppy disc system, a floppy disc (also referred to as diskette) of magnetic flexible sheet material housed within a protective envelope of a predetermined configuration is inserted in a processing unit of the floppy disc drive, where data is read out from or written in the floppy disc.

In conjunction with the floppy disc system, there have heretofore been used various sensor circuits such as a disc-in sensor for detecting whether or not a floppy disc is normally inserted within the floppy disc drive, a write protect sensor for detecting whether data previously stored in the inserted floppy disc is to be protected from writing operation, a so-called track zero sensor for determining whether a magnetic head is positioned on the zeroth track of the disc and others.

In general, the sensor is constituted by a so-called photosensor which comprises an infrared-ray emission diode (hereinafter also referred to as LED in abridgement) and a phototransistor disposed in opposition to the LED with a gap defined therebetween, wherein the presence or absence of an object in the gap is detected in dependence on the output signal state of the phototransistor. For preventing the photosensor from erroneous operation under the influence of ambient illumination or the like, the LED is supplied with a current of magnitude in a range of ca. 15 mA to ca. 20 mA. On the other hand, the phototransistor is so connected that a current on the order of 10 mA may flow therethrough in the conducting state although the current depends on the minimum current required for operation of the sensor circuit.

Under the circumstances, the current required for the operation only of the three types of sensor circuits mentioned above will amount to 75 mA to 90 mA. Accordingly, assuming that these sensor circuits operate at a source voltage of 5 V, electric power on the order of 0.5 W is required.

FIG. 1 of the accompanying drawings shows a typical one of the hitherto known sensor circuit. Since the disc-in sensor, the write protect sensor and the zeroth track sensor are substantially of similar circuit configuration, the description will be made on the assumption that the circuit configuration shown in FIG. 1 is for the zeroth track sensor.

In FIG. 1, a reference symbol 1 denotes an infrared-ray emission diode or LED, 2 denotes a phototransistor, 3 denotes a microprocessor (commercially available under the trade name "TT6677S") which serves as a control circuit, 4 denotes a NOT gate serving as a driver circuit for an interface (not shown) to a controller (not shown), and $R_1$ and $R_2$ denote working (bias) resistors for the LED 1 and the phototransistor 2, respectively.

The output signal of the phototransistor 2, i.e. the signal $S_1$ indicative of detection of the zeroth track in the case of the illustrated example, is applied to an input terminal a of the microprocessor 3. In response to the input signal $S_1$, the microprocessor 3 outputs a signal $S_2$ from a terminal b, which signal $S_2$ is applied to the input of the NOT gate 4, whereby an inverted signal $S_3$ outputted from a terminal c is utilized for driving the interface (not shown).

Next, operation of the sensor circuit will be described with reference to a program stored in the microprocessor 3 and shown in a flow chart of FIG. 2 of the accompanying drawings.

The microprocessor 3 is adapted to perform ON-/OFF control of a spindle motor of a floppy disc drive on the basis of a motor control signal, control of a step motor, control of revolution number (check of revolution number) and the like through steps A.

In this connection, although the control which has to be performed at a high speed is carried out by resorting to a so-called interrupt routine, the ordinary control is performed on the basis of the results of polling (for scanning selection).

Accordingly, the processing program executed by the microprocessor 3 includes a loop for the polling (which will hereinafter be referred to as the main loop). It should be noted that the output signal of the zeroth track sensor, i.e. the output signal $S_1$ of the phototransistor $S_1$ is processed this main loop.

For example, upon application of the output signal $S_1$ of the phototransistor 2 at the terminal a of the microprocessor (at step B), this signal $S_1$ is processed by excecuting the main loop. More specifically, when the signal $S_1$ is at a low level as decided at a step C, the microprocessor determines whether the step motor is in predetermined phase at a step D. If so, the signal $S_2$ of a high level is outputted from the terminal b of the microprocessor at a step E. This signal $S_2$ is inverted through the NOT gate 4 to the signal $S_3$ which is supplied to the controller (not shown) by way of the interface (also not shown). Obviously, when the signal $S_1$ is high (i.e. at high level), the signal $S_2$ is low.

The output signal $S_2$ is latched internally of the microprocessor 3 to be held till the succeeding polling.

In the prior art sensor circuit of the type described above, a relatively large current of 15 mA to 20 mA flows through the LED 1 during execution of the main loop for performing the polling, bringing about a power consumption which is not negligible.

In these years, endeavors have been made to develop a portable type floppy disc drive adapted to be energized by a cell or battery in accompaniment with tendency for implementation of the data processing apparatus in a small size at light weight. To this end, the power consumption of the floppy disc drive as a whole has to be reduced as low as possible, which in turn means that the power consumption of the sensor circuits should be suppressed to a possible minimum.

For satisfying the requirement mentioned above, it is indispensable to use the sensor components of low power consumption type. In practice, however, great difficulty is encountered in selecting the components for the sensor circuit which meet all the requirements inclusive of those imposed on the manufacturing cost, sensitivity and others.

SUMMARY OF THE INVENTION

In light of the state of the prior art, it is an object of the present invention to provide a sensor circuit which is capable of contributing to reduction of power consumption of the whole floppy drive system in which the sensor circuit is implemented without using the circuit components of low power consumption type.

In view of the above and other objects which will be more apparent as description proceeds, there is provided according to a general aspect of the present invention a sensor circuit comprising a sensor for detecting change in a particular state and a control circuitry for performing predetermined controls in response to the output signal of the sensor applied to the control circuitry in a discontinuous or discrete manner, characterized in that the sensor circuitry is supplied with a power supply current only when the control circuitry requires the fetching of the output signal of the sensor circuitry.

BRIEF DESCRIPTION OF THE DRAWINGS

The above and other objects, features and advantages of the invention will be more apparent upon consideration of the following description taken in conjunction with preferred embodiments shown, only by way of example, in the accompanying drawings, in which:

FIG. 9 is a timing diagram illustrating wave forms of signals produced in the sensor circuit shown in FIG. 8.

DESCRIPTION OF THE PREFERRED EMBODIMENTS

In the following, the invention will be described in detail in conjunction with the exemplary embodiments thereof.

Figure 3:
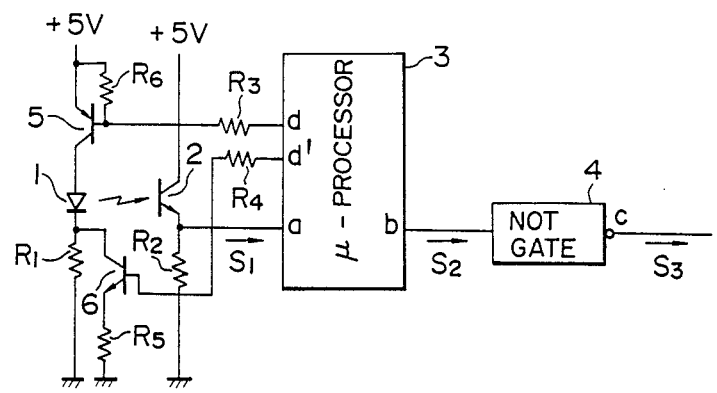
FIG. 3 is a diagram showing a circuit arrangement of a sensor circuit according to an exemplary embodiment of the invention.

FIG. 3 is a circuit diagram showing an arrangement of a sensor circuit according to an embodiment of the invention for an application in which the sensor circuit is employed as the zeroth track sensor in a floppy disc drive.

In FIG. 3, a reference numeral 1 denotes a LED, 2 denotes a phototransistor, 3 denotes a microprocessor, 4 denotes a NOT gate or inventor for driving an interface (not shown), 5 denotes a transistor for switching a power supply current for the LED 1, a numeral 6 denotes a transistor for enhancing rise-up characteristic of the LED 1 upon application of the power supply current thereof, $R_1$ to $R_5$ denote resistors, respectively, and $R_6$ denotes a resistor constituting a positive feedback path to the switching transistor 5 for enhancing the operation characteristic thereof.

It should be mentioned that value of the resistor $R_5$ is selected smaller than that of the resistor $R_1$.

With the arrangement of the sensor circuit according to the invention, a pulse current is applied to the base of the transistor 5 from a terminal d of the microprocessor 3 at a timing described hereinafter. The transistor 5 is turned on only when the signal appearing at the terminal d is at a low level.

Additionally, a pulse current is also applied to the base of the transistor 6 from a terminal d' of the microprocessor 3 at a predetermined timing.

Figure 4:
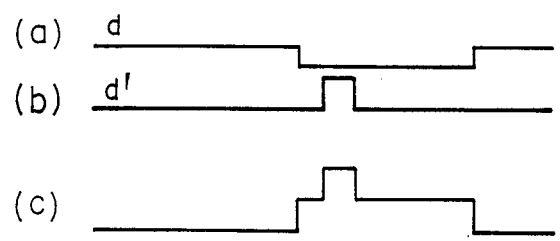
FIG. 4 is a waveform diagram for illustrating waveforms of currents for driving a light emission diode or LED used in the sensor circuit shown in FIG. 3.

FIG. 4 is a waveform diagram showing the pulse currents produced at the terminals d and d' of the microprocessor 3 together with a current flowing through the LED 1. More specifically, there is shown at (a) in FIG. 4 the waveform of the pulse current supplied to the base of the transistor 5 from the terminal d of the microprocessor 3. In response to application of this pulse current, the LED 1 emits light. However, a certain time delay is involved for the LED 1 to attain the stable state. For preventing the time delay or lag from exerting adverse influence to the control described hereinafter, the pulse current of a short duration or pulse width as shown at (b) in FIG. 4 is applied to the base of the transistor 6 from the terminal d' of the microprocessor only at the moment the output level of the terminal d becomes low, to thereby increase the current for driving the LED at the rise-up time of the current (a). More specifically, since the value of the resistor $R_5$ is selected smaller than that of the resistor $R_1$, a by-pass circuit is formed by way of the transistor 6 which is turned on at the time point when the current from the terminal d rises up, as the result of which the current of the waveform shown at (c) in FIG. 4 flows through the LED 1.

The output signal $S_1$ of the phototransistor 2 is applied to the terminal a of the microprocessor 3. In response to this signal $S_1$, a corresponding signal $S_2$ is outputted from the terminal b to be inverted through the NOT gate 4, resulting in that a signal $S_3$ is produced from the terminal c for driving the interface (not shown) interposed between the illustrated sensor circuit and a controller (not shown).

Figure 2:
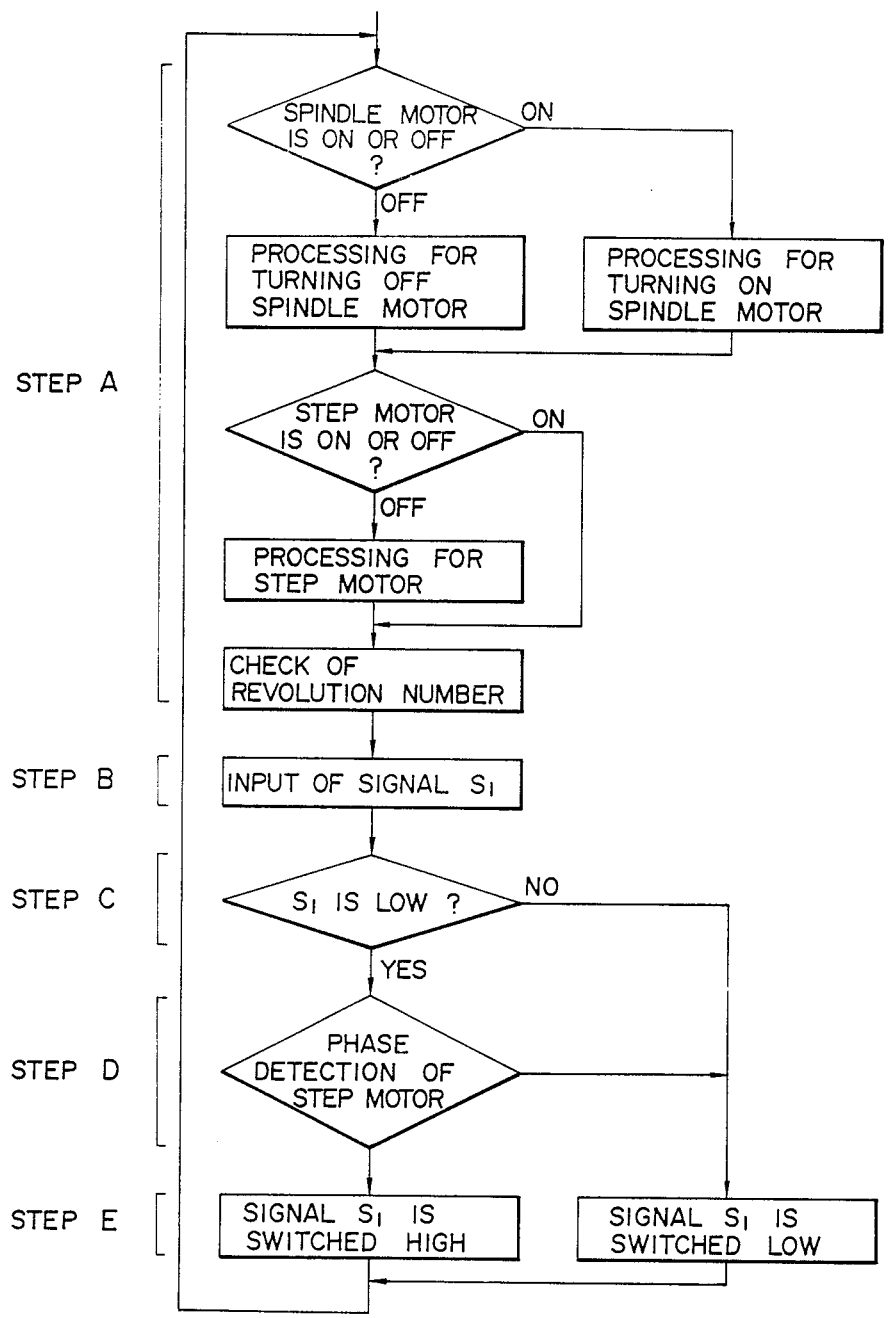
FIG. 2 is a flowchart for illustrating a part of process for processing output signal of a zeroth track sensor in a hitherto known floppy disc drive.
Figure 5:
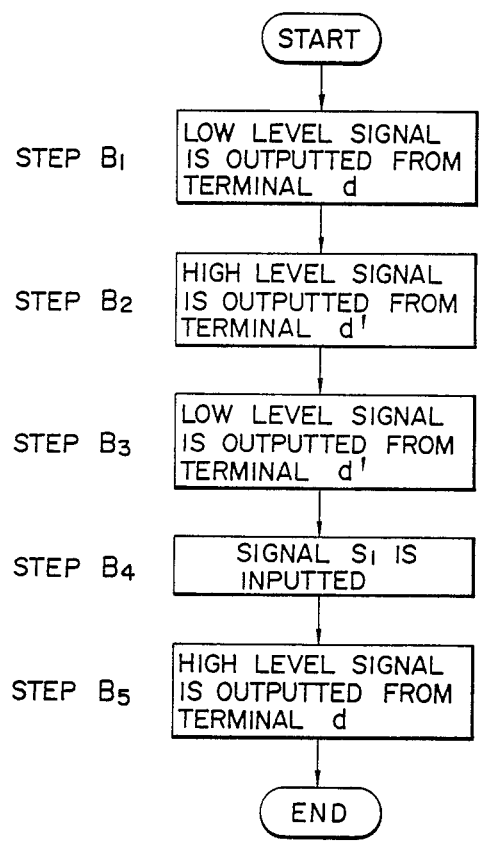
FIG. 5 is a flow chart for illustrating a part of program for processing the output signal of a zeroth track sensor incorporated in a floppy disc drive.

FIG. 5 shows in a flowchart a part of a program executed in conjunction with the control of the sensor circuit. This flowchart corresponds to the step B of the flow chart shown in FIG. 2.

In the case of the sensor circuit shown in FIG. 3, the output level at the terminal d of the microprocessor 3 becomes low after the completion of the main loop executed through the steps A (FIG. 2), whereupon the transistor 5 is turned on (i.e. in the conducting state) as shown in FIG. 5 at a step $B_1$.

Subsequently, during a period in which the output level at the terminal d' is low (steps $B_2$, $B_3$), the transistor 6 is turned on to increase the power supply current for the LED at the rise-up time thereof. At a succeeding step $B_4$, the output signal $S_1$ of the phototransistor 2 is fetched by the microprocessor 3, which is followed by a step $B_5$ where the output level of the terminal d becomes high to stop the power supply current supplied to the LED 1.

Figure 1:
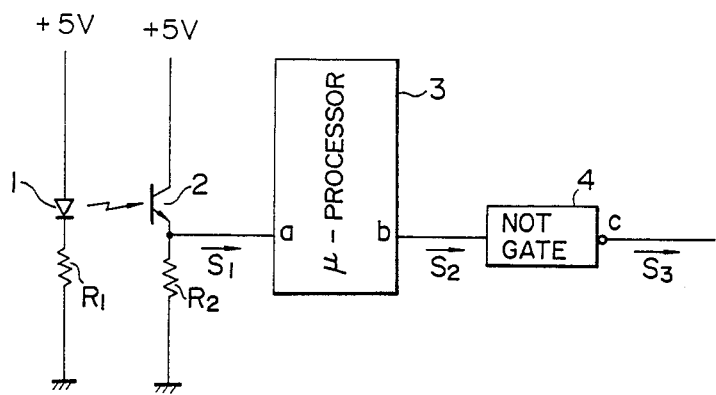
FIG. 1 is a circuit diagram showing a configuration of a hitherto known sensor circuit.

In this manner, in case the time duration in which the power supply current flowing through the LED 1 of the sensor circuit according to the present invention is 10 μS when the time required for executing the main loop is 150 μS, by way of example, the average current can be reduced to ca. 1/15 when compared with the hitherto known sensor circuit such as shown in FIG. 1.

Figure 6:
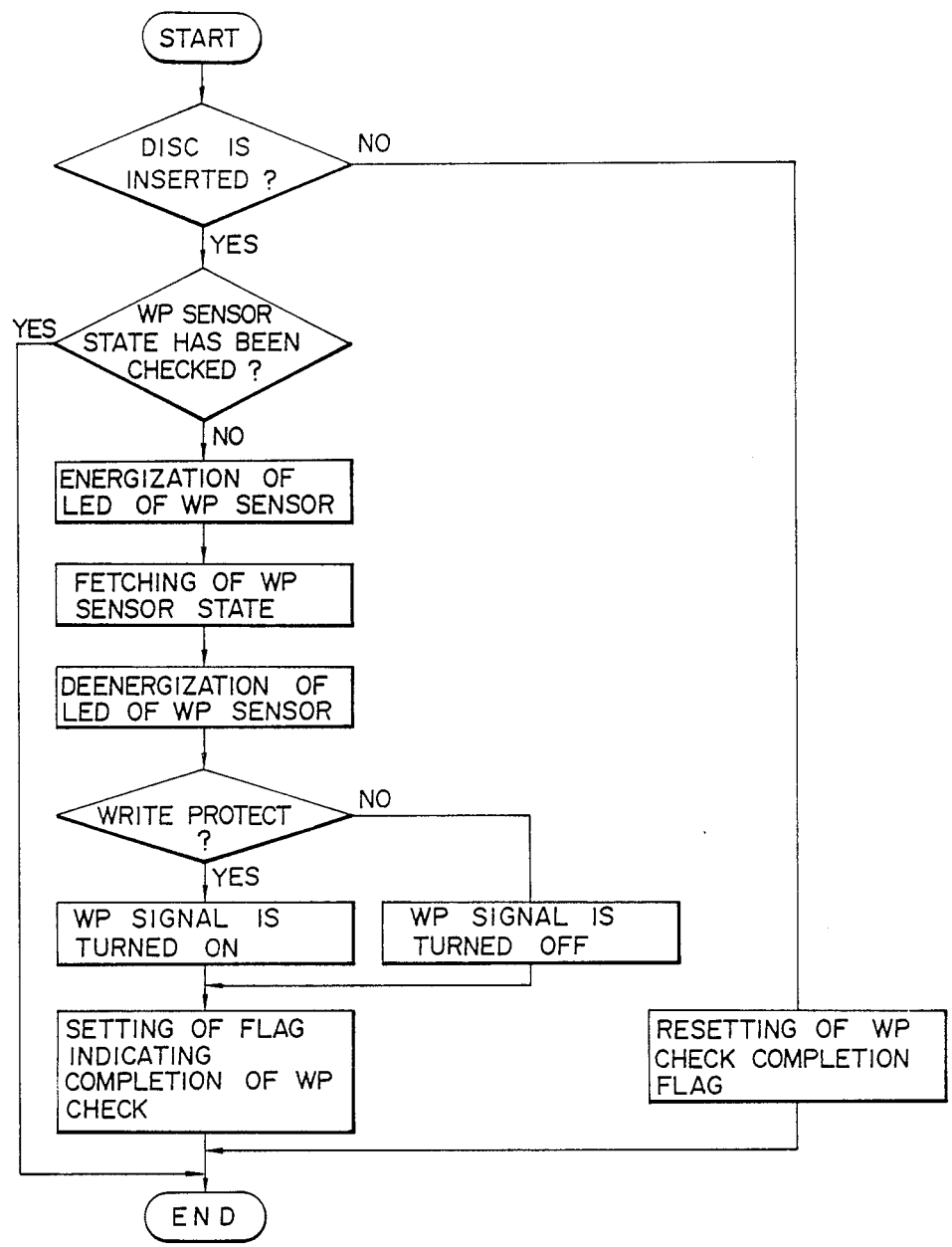
FIG. 6 is a flow chart for illustrating a processing program for a case in which the invention is applied to the write protect sensor current incorporated in a floppy disc drive.

The foregoing description has been made on the assumption that the sensor circuit according to the present invention is used as the zeroth track sensor of the floppy disc drive. In case the sensor circuit according to the invention is used as the write protect (WP) sensor for the floppy disc drive, the processing illustrated in the flowchart of FIG. 6 is performed.

According to this processing, the current is allowed to flow through the LED 1 only when a floppy disc is newly inserted. Through this control, the electric power consumed by the sensor circuit can be significantly reduced.

Figure 7:
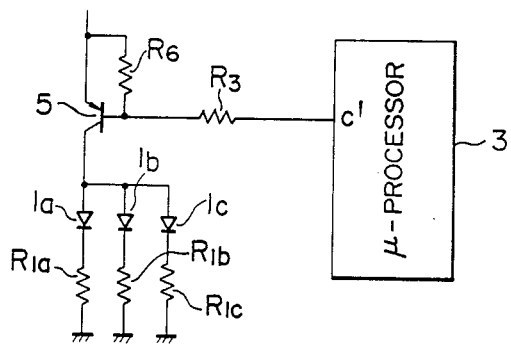
FIG. 7 is a circuit diagram showing a configuration of the sensor circuit according to another embodiment of the invention.

According to another embodiment of the present invention, it is possible to control simultaneously a plurality of sensors by providing the power supply current controlling transistor 5 in such a circuit configuration as illustrated in FIG. 7, with this circuit arrangement, the power supply current is supplied to the LED 1a, 1b or 1c only around a time point at which the sensor signal is to be fetched by the microprocessor 3. The LEDs 1a, 1b and 1c are disposed at positions differing from one another. The associated phototransistors as well as signal lines are omitted from illustration.

Further, it should be mentioned that the teaching of the present invention can be applied to the control of power supply current of other various sensors than the photoelectric sensor mentioned above, to assure that the driving current is supplied to the sensor only when the detection signal outputted by the sensor is to be fetched by a controller such as the microprocessor.

Figure 8:
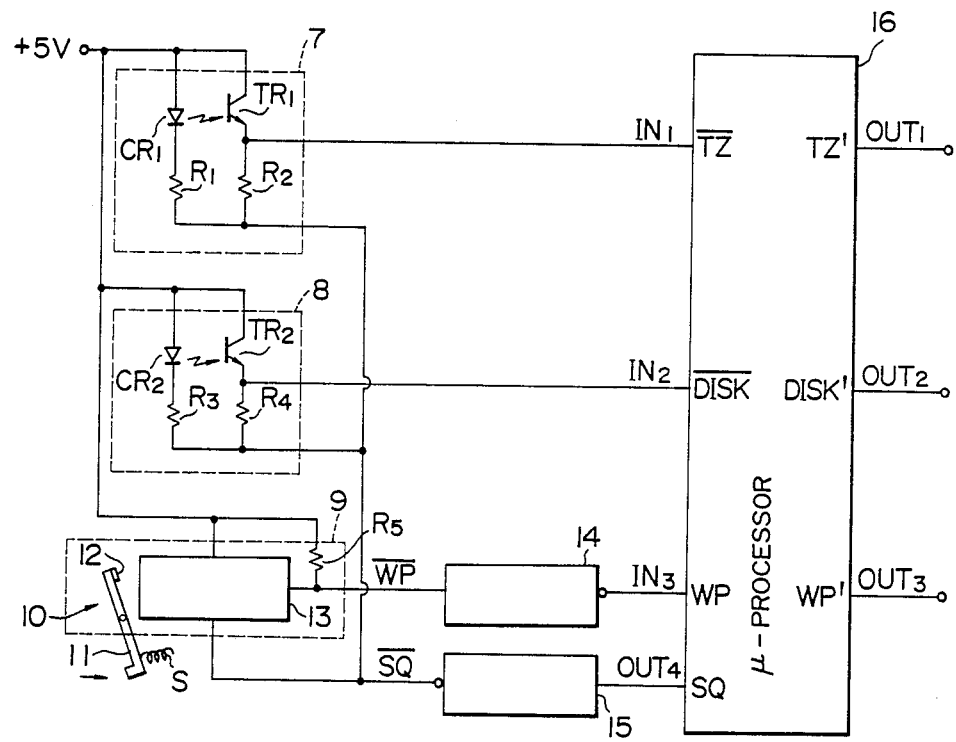
FIG. 8 is a circuit diagram showing a further embodiment of the invention.

FIG. 8 shows in a circuit diagram a further embodiment of the invention in which the sensor circuit according to the invention is adopted as the zeroth track sensor circuit, the disc-in sensor circuit and the write protect sensor circuit for a floppy disc drive.

Referring to FIG. 8, a reference numeral 7 denotes the zeroth track sensor (commercially available under "TLP 804") for detecting whether or not the magnetic head of the floppy disc drive is positioned on the zeroth track. This sensor circuitry is constituted by a LED designated by symbol CR1, resistors R1 and R2, and a phototransistor TR1. Generally, the floppy disc drive is so constructed that light emitted by the LED CR1 is prevented from impinging on the phototransistor TR1 when the magnetic head is positioned on the zeroth track.

In the case of the floppy disc drive of such a structure in which the magnetic head is displaced to the position on the zeroth track immediately after the turning-on of the power supply source, it is possible to determine whether the mechanism of the floppy disc drive operates orderly by detecting the position of the magnetic head relative to the zeroth track.

Turning back to FIG. 8, a reference numeral 8 denotes the disc-in sensor (commercially available under "EE-SY 102") for detecting whether the floppy disc is correctly inserted in the floppy disc drive. This sensor is constituted by a LED designated by CR2, resistors R3 and R4, and a phototransistor TR2. The floppy disc drive is of such a structure that light emitted by the LED is inhibited from reaching the phototransistor TR2 only when the floppy disc has been correctly inserted.

A reference numeral 9 denotes the write protect sensor for detecting whether or not the floppy disc drive should be in the write protecting state. This sensor 9 is constituted by a write protect mechanism 10, a Hall IC element (commercially available as "DN 6837B:) 13, and a resistor R5.

The write protect mechanism 10 is composed of a swingable arm 11 pivotally mounted within the floppy disc drive, a permanent magnet 12 mounted on the arm 11 at one end thereof, and a spring S which resiliently urges the permanent magnet 12 toward the Hall IC element 13.

Unless a cartridge of the floppy disc is in the write protect state, the other end of the swingable arm 11 is pressed by the cartridge, bringing about a gap or clearance between the permanent magnet 12 and the Hall IC element 13. As the result, magnetic flux generated by the permanent magnet 12 is prevented from reaching the Hall IC element 13 which is thus in the OFF state. When the cartridge of the floppy disc is in the write protect state, the other end of the swingable arm 11 located opposite to the permanent magnet 12 is not pressed by the cartridge even in the disc-inserted state. Thus, no gap is produced betweeen the permanent magnet 12 and the Hall IC element 13. Consequently, magnetic flux produced by the permanent magnet 12 reaches the Hall IC element 13 which is thus held in the ON state where a write protect signal $\overline{WP}$ is outputted.

As is well known, the function of the Hall IC element 13 is to convert changes in the magnetic field intensity correspondingly to changes in a voltage by making use of the Hall effect. A numeral 14 denotes a Schmitt trigger IC of NOT gate (inventer) type having a function to eliminate chattering components of the write protect signal $\overline{WP}$ outputted from the write protect sensor 9.

A reference numeral 15 denotes a driver IC of an open collector NOT gate configuration for driving the sensors 7, 8 and 9. A numeral 16 denotes the microprocessor which produces a sense request signal SQ from an output terminal OUT4 when the output signal of the sensor 7, 8 or 9 is to be fetched. The signal SQ is inverted through the driver IC 15. The sensors 7, 8 and 9 are driven with the signal $\overline{SQ}$ outputted by the driver IC 15. As the result, the zeroth track signal $\overline{TZ}$ is supplied to an input terminal IN1 of the microprocessor 16, the disc-in signal $\overline{DISK}$ is applied to an input terminal IN2, and the write protect signal WP is applied to an input terminal IN3. These signals undergo sequentially processings in accordance with a program stored in the microprocessor 16, the results of the processings being stored in a memory incorporated in the microprocessor 16, while a zeroth track signal TZ', a disc-in signal DISK' and a write protect signal WP' are produced from output terminals OUT1, OUT2 and OUT3 of the microprocessor 16, respectively, to be supplied to an interface circuit (not shown).

Next, operation of the circuit shown in FIG. 8 will be described in detail on the assumption that the floppy disc drive is of such a type in which the magnetic head is caused to move to the position on the zeroth track in succession to the turning-on of the power supply source. At first, upon power-on, the magnetic head is displaced to the position on the zeroth track under the control of the microprocessor 16. Subsequently, the microprocessor checks as to whether the magnetic head is located at the position on the zeroth track, i.e.

whether the magnetic head is in the zeroth track state. More specifically, the program stored in the microprocessor 16 is activated to cause the microprocessor to produce thrice the sensor request signal SQ at a short time interval in order to check the state of the sensor 7. In the zeroth track state, light emitted by the LED CR1 is inhibited from impinging on the phototransistor TR1, as described hereinbefore, resulting in that the phototransistor TR1 remains in the OFF (non-conducting) state. As the consequence, the emitter potential of the phototransistor TR1 is low, which means that the input terminal IN1 of the microprocessor 16 is also at low level. In this manner, the microprocessor 16 can determine whether the sensor 7 is in the zeroth track state or not by checking the signal level making appearance at the input terminal IN1 in response to the sensor request signal SQ. For enhancing the reliability of detection of the sensor state, the microprocessor 16 produces thrice the sensor request signal SQ and identifies the zeroth track state of the sensor 7 when the low level signal indicative of the zeroth track state makes appearance twice or more at the input terminal IN1. Of course, the sensor request signal SQ may be issued only once, if desired. The result of the decision is stored in the memory. At the same time, the microprocessor 16 produces the zeroth track signal TZ from the output terminal OUT1, which signal is transferred to the interface circuit (not shown). Subsequently, execution of the program proceeds to a step where decision is made as to whether the floppy disc drive is in the disc-in state. More specifically, the microprocessor 16 checks if the floppy disc has been correctly inserted in the floppy disc drive (the disc-in state). To this end, the relevant program stored in the microprocessor 16 is activated to cause the microprocessor 16 to issue thrice the sensor request signal SQ at a short time interval to check the state of the sensor 8. In the disc-in state, light emitted by the light emission diode CR2 is prevented from falling on the phototransistor TR2, which is thus in the OFF state. As the consequence, the emitter potential of the phototransistor TR2 is at low level, resulting in that the input terminal IN2 of the microprocessor 16 is also at low level. In this manner, the microprocessor 16 can make a decision as to whether the sensor 8 is in the disc-in state by checking the signal level making appearance at the input terminal IN2 in response to the sensor request signal SQ. When the disc-in state is detected twice or more, it is decided that the floppy disc drive is in the disc-in state. The result of the decision is stored in the memory incorporated in the microprocessor, while the disc-in signal DISK' is produced from the output terminal OUT2 of the microprocessor 16 to be supplied to the interface circuit (not shown). Subsequently, execution of the program proceeds to a step where decision is made as to whether the floppy disc is in the write protect state. More specifically, the stored relevant program is activated to cause the microprocessor 16 to issue thrice the sensor request signal SQ. When the floppy disc inserted in the floppy disc drive is in the write protect state, the magnetic flux produced by the permanent magnet 11 constituting the write protect switch mechanism 10 reaches the Hall IC element 13, which is then turned on to output the write protect signal $\overline{WP}$. The write protect signal $\overline{WP}$ is inverted by the Schmitt trigger IC 14 with the chattering component being removed. The write protect signal SP outputted by the Schmitt trigger is then applied to the input terminal IN3 of the microprocessor 16. Thus, the microprocessor 16 can make decision as to whether the floppy disc is in the write protect state or not by checking the signal level making appearance at the input terminal IN3 in response to the sensor request signal SQ. To this end, when the write protect state is detected twice or more on the basis of the input level at the terminal IN3, decision is made to such effect that the floppy disc is in the write protect state. The result of the decision is stored in the memory of the microprocessor. At the same time, the write protect signal WP' is produced from the output terminal OUT3 of the microprocessor 16 to be supplied to the interface circuit (not shown).

FIG. 9 shows a timing chart for illustrating operations of the circuit shown in FIG. 8. In FIG. 9, the waveform shown at SQ represents the pulse-like sensor request signals produced by the microprocessor 16 each at a short time interval for detecting the states of the sensors 7, 8 and 9, respectively.

The signal $\overline{SQ}$ corresponds to the signal SQ inverted through the driver IC 15. The signal $\overline{TZ}$ represents the emitter potential of the phototransistor TR1 of the zeroth track sensor 7 in the zeroth track state (starting from a point a). This signal is applied to the input terminal IN1 of the microprocessor 16. The signal $\overline{DISK}$ represents the emitter potential of the phototransistor TR2 constituting a part of the disc sensor 8 in the disc-in state, this potential being applied to the input terminal IN2 of the microprocessor 16.

The signal WP represents the output signal $\overline{WP}$ produced by the Hall IC element 13 in the write protect state (starting from a point c). This signal is applied to the input terminal IN3 of the microprocessor 16 after having been inverted through the Schmitt trigger IC 14.

Although the invention has been described in conjunction with the preferred embodiments thereof, it should be understood that modifications and variations will readily occure to those skilled in the art without departing from the spirit and scope of the invention defined by the appended claims.

What is claimed is:

1. An apparatus for sensing conditions associated with the operation of a system comprising:
   a power supply;
   sensor means, comprising:
      a light emission diode having an anode and a cathode;
      a photoelectric element; and
      a transistor for receiving a receive power signal, operatively connected to the power supply for supplying a power supply current to the light emission diode in response to receipt of the receive power signal, the transistor being interposed between the anode of the light emission diode and the power supply, the photoelectric element generating a sensor means output based on at least a condition of the system when the light emission diode is supplied with the power supply current; and
   control means, comprising a microprocessor, for supplying the receive power signal to the transistor of the sensor means, at times selected by the control means, the control means being operative to receive the sensor means output at the selected times.

2. An apparatus for sensing conditions associated with the operation of a system comprising:
   a power supply;
   sensor means, comprising:

a light emission diode;
a photoelectric element; and
a driver IC, having a NOT gate, for receiving a receive power signal, and operatively connected to the power supply for supplying a power supply current to the light emission diode in response to receipt of the receive power signal, the photoelectric element generating a sensor means output based on at least a condition of the system when the power supply current is supplied to the light emission diode; and control means, comprising a microprocessor, for supplying the receive power signal to the driver IC of the sensor means, at times selected by the control means, the control means being operative to receive the sensor means output at the selected times.

3. An apparatus for sensing conditions associated with the operation of a system comprising:
a power supply;
sensor means, comprising:
a light emission diode;
a photoelectric element; and
a driver IC, having a NOT gate, for receiving a receive power signal, and operatively connected to the power supply for supplying a power supply current to the photoelectric element in response to receipt of the receive power signal, the photoelectric element generating a sensor means output based on at least a condition of the system when the power supply current is supplied to the photoelectric element; and
control means, comprising a microprocessor, for supplying the receive power signal to the driver IC of the sensor means, at times selected by the control means, the control means being operative to receive the sensor means output at the selected times.

4. An apparatus for sensing conditions associated with the operation of a system, comprising:
a power supply;
sensor means, comprising:
a Hall IC element;
a permanent magnet, having magnetic flux, the Hall IC element being operable to sense the magnetic flux of the permanent magnet; and
a driver IC, having a NOT gate, for receiving a receive power signal, and operatively connected to the power supply for supplying a power supply current to the Hall IC element in response to receipt of the receive power signal, the Hall IC element sensing the magnetic flux of the permanent magnet and generating a sensor means output in accordance with the magnetic flux indicative of at least a condition of the system when the Hall IC element is supplied with the power supply current;
control means, comprising a microprocessor, for supplying the receive power current to the driver IC of the sensor means, at times selected by the control means, the control means being operative to receive the sensor means output at the selected times.

* * * * *